(12) United States Patent
Kim et al.

(10) Patent No.: US 9,519,998 B2
(45) Date of Patent: Dec. 13, 2016

(54) THREE DIMENSIONAL MONTAGE GENERATION SYSTEM AND METHOD BASED ON TWO DIMENSIONAL SINGLE IMAGE

(71) Applicant: KOREA INSTITUTE OF SCIENCE AND TECHNOLOGY, Seoul (KR)

(72) Inventors: Ig Jae Kim, Goyang-si (KR); Yu Jin Hong, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 194 days.

(21) Appl. No.: 13/790,122

(22) Filed: Mar. 8, 2013

(65) Prior Publication Data
US 2013/0235033 A1 Sep. 12, 2013

(30) Foreign Application Priority Data
Mar. 9, 2012 (KR) .......................... 10-2012-0024556

(51) Int. Cl.
| | | |
|---|---|---|
| G06T 17/00 | (2006.01) | |
| G06K 9/00 | (2006.01) | |
| G06K 9/62 | (2006.01) | |

(52) U.S. Cl.
CPC ............ G06T 17/00 (2013.01); G06K 9/00208 (2013.01); G06K 9/00221 (2013.01); G06K 9/6255 (2013.01)

(58) Field of Classification Search
CPC .......... G06T 17/00; G06T 17/20; G06T 19/00; G06T 17/10; G06T 17/005

(Continued)

(56) References Cited

U.S. PATENT DOCUMENTS 7,221,809 B2 * 5/2007 Geng ................. G06K 9/00288
345/419
7,756,325 B2 * 7/2010 Vetter et al. .................. 382/154
(Continued)

FOREIGN PATENT DOCUMENTS

JP 2008-225970 9/2008
KR 10-2001-0084670 A 9/2001
(Continued)

OTHER PUBLICATIONS

"Estimating Image Depth Using Shape Collections" (by Hao Su Qixing Huang, Stanford University; Niloy J. Mitra, University College London; Yangyan Li Leonidas Guibas, Stanford University, Sep. 9, 2014).*

Primary Examiner — Ke Xiao
Assistant Examiner — Gordon Liu
(74) Attorney, Agent, or Firm — NSIP Law

(57) ABSTRACT

The present disclosure relates to a three-dimensional montage generation system and method based on a two-dimensional single image. An embodiment of the present disclosure may generate a three-dimensional montage in an easy, fast and accurate way by using a two-dimensional front face image data, and estimate face portions, which cannot be restored by using a single photograph, in a statistic way by using a previously prepared face database. Accordingly, an embodiment of the present disclosure may generate a three-dimensional personal model from a single two-dimensional front face photograph, and depth information such as nose height, lip protrusion and eye contour may be effectively estimated by means of statistical distribution and correlation of data.

16 Claims, 3 Drawing Sheets

(58) Field of Classification Search
USPC .................................................. 345/419, 420
See application file for complete search history.

(56) References Cited

U.S. PATENT DOCUMENTS

| | | | |
|---|---|---|---|
| 2006/0284880 A1* | 12/2006 | Zhou et al. ................... | 345/582 |
| 2010/0134487 A1* | 6/2010 | Lai et al. ....................... | 345/419 |
| 2010/0172550 A1* | 7/2010 | Gilley ............... | G06F 17/30259 |
| | | | 382/118 |

FOREIGN PATENT DOCUMENTS

| KR | 10-2003-0086063 A | 11/2003 |
|---|---|---|
| KR | 10-2004-0009460 A | 1/2004 |
| KR | 10-2006-0064553 | 6/2006 |

* cited by examiner

THREE DIMENSIONAL MONTAGE GENERATION SYSTEM AND METHOD BASED ON TWO DIMENSIONAL SINGLE IMAGE

CROSS-REFERENCE TO RELATED APPLICATION

This application claims priority to Korean Patent Application No. 10-2012-0024556, filed on Mar. 9, 2012, and all the benefits accruing therefrom under 35 U.S.C. §119, the contents of which in its entirety are herein incorporated by reference.

BACKGROUND

1. Field

The present disclosure relates to a three-dimensional montage generation system and method.

2. Description of the Related Art

A montage is made for helping an arrest of a criminal. Such a montage is directly sketched by hands based on a specialist and eyewitness evidence or made by combining most similar parts (namely, a facial shape, the eyes, the nose, the lips or the like) of a suspect with a computer program.

If a montage is used, a criminal may be arrested faster, which may comfort the victim and prevent additional harm. In addition, distributed montages may shrink the suspect confidence. Therefore, making and distributing montages plays an important role in the public order and security. However, the montage made as described above shows a front face and does not give figures of a suspect from various view points. For example, a feature such as a wound at the side face, which cannot be easily expressed on the front face, is generally supplemented as a written comment. Further, since a witness frequently sees a criminal just in a very short time due to the urgent situation, the front face of the criminal may not be watched in many cases. In order to make an accurate montage, a three-dimensional montage model of a suspect which may be seen from various view points is required, rather than a simple two-dimensional montage. More accurate montage will help a faster arrest of the criminal.

Various kinds of existing montage software also provide three-dimensional faces, but within a limited angle, and such three-dimensional faces are not natural since they are made by means of a simple warping technology. Along with the development of technology, there have been introduced schemes for obtaining a relatively natural three-dimensional personal model by approximating a front picture and a side picture. However, such schemes apply an optimization algorithm by mapping two-dimensional data with three-dimensional data and approximating facial looks to decrease errors. The optimization algorithm generally consumes two or three hours, which may be not so useful for actual software.

By virtue of rapid development of computer graphics technologies in 1990s, the three-dimensional face modeling technique is presently broadly used in movie industries or for animations, games or the like. Since face modeling for games or animations is just creating a virtual character or making an avatar similar to an own figure, personal tastes or preferences such as outward satisfaction or familiarity give the most influence on the model, rather than accuracy or reliability of the model. In this case, for the selection of a user, a data provider should possess various model data, which however consumes much time and cost since animators should give careful manual endeavors by using advanced tools.

Different from the above, accuracy and reality are demanded in montage modeling for arresting a criminal. The term 'accuracy and reality' used herein does not mean how a two-dimensional montage made based on eyewitness evidence is similar to an actual face of a criminal but means similarity between the prepared montage and a generated three-dimensional model.

Korean Unexamined Patent Publication No. 10-2004-0009460 discloses the most public method for combining and composing a montage by selecting parts most similar to a suspect. In particular, since each facial part is possessed not as a simple two-dimensional partial picture but as a three-dimensional data format, a montage is composed on a three-dimensional area. This method stores data in a range data format in consideration of a size of the three-dimensional DB. The three-dimensional DB is searched by using feature information of a two-dimensional image, and a composing location is determined by projecting three-dimensional partial DB data to coordinates of a two-dimensional facial part, which however does not ensure high degree of completion of the three-dimensional model.

Korean Unexamined Patent Publication No. 10-2001-0084670 obtains a three-dimensional personal model only from two-dimensional photograph data. However, since the height of the nose and the protrusion of the lips of a model may not be easily expressed by using only a single photograph showing a front face, a photograph showing a side face is additionally used to obtain a personalized model.

Korean Unexamined Patent Publication No. 10-2003-0086063 illustrates a method of making a three-dimensional caricature model from a general two-dimensional photograph. A template three-dimensional model to be transformed is present, and, after the template three-dimensional model is projected two-dimensionally, the projected model is mapped with feature points of the two-dimensional photograph to obtain a transformation matrix so that mapping errors are repeatedly reduced.

However, such conventional techniques need a side face photograph as well as a two-dimensional front face photograph and are not able to generate a three-dimensional model where depth information of each facial part is reflected.

RELATED LITERATURES

Patent Literature

Korean Unexamined Patent Publication No. 10-2004-0009460

Korean Unexamined Patent Publication No. 10-2001-0084670

Korean Unexamined Patent Publication No. 10-2003-0086063

SUMMARY

The present disclosure is directed to providing a three-dimensional montage generation system and method, which may generate a three-dimensional montage in an easy, rapid and accurate way by using two-dimensional front face image data and also estimate facial parts, which may not be restored by using a single photograph, from a previously prepared face database in a statistical way.

In one aspect, there is provided a three-dimensional montage generation system based on a two-dimensional single image, which includes: an input unit for inputting a two-dimensional face image; a feature point extraction unit for extracting a feature point of the input two-dimensional face image; a standard database for storing three-dimensional face shape information previously prepared; a depth estimation unit for obtaining a correlation of each face portion from the stored three-dimensional face image information and estimating a depth of each portion of the two-dimensional face image based on the obtained correlation of each face portion; a model transformation unit for projecting the two-dimensional face image to a preset three-dimensional template model and transforming the three-dimensional template model based on the feature point of the two-dimensional face image and the depth information of each portion of the two-dimensional face image estimated by the depth estimation unit; and a montage generating unit for generating a three-dimensional montage by rendering the two-dimensional face image to the transformed three-dimensional template model.

The model transformation unit may calculate translations, rotations and scales of the two-dimensional face image and the three-dimensional template model, and repeat the projecting operation and the calculating operation until an error between the two-dimensional face shape and the three-dimensional template model decreases smaller than a preset threshold value.

The model transformation unit may transform a facial shape of the three-dimensional template model by means of a blend shape technique.

The depth estimation unit may estimate a depth of each portion of the two-dimensional face image by using a K-Nearest Neighbor (KNN) algorithm.

The montage generating unit may generate a three-dimensional montage by estimating an omitted portion of the two-dimensional face image based on the correlation of each face portion.

In another aspect, there is provided a three-dimensional montage generation method based on a two-dimensional single image, which includes: extracting a feature point of a two-dimensional face image input by a user; obtaining a correlation of each face portion from three-dimensional face image information stored in a standard database previously prepared; estimating a depth of each portion of the two-dimensional face image based on the obtained correlation of each face portion; transforming a three-dimensional template model, previously prepared, by using the feature point of the two-dimensional face image and the depth information of each portion of the two-dimensional face image; and generating a three-dimensional montage by rendering the two-dimensional face image to the transformed three-dimensional template model.

The transforming of a three-dimensional template model may include: projecting the two-dimensional face image to the three-dimensional template model; calculating translations, rotations and scales of the two-dimensional face image and the three-dimensional template model; and repeating the projecting operation and the calculating operation until an error between the two-dimensional face shape and the three-dimensional template model decreases smaller than a preset threshold value.

The transforming of a three-dimensional template model may include transforming a facial shape of the three-dimensional template model by means of a blend shape technique.

The estimating of a depth of each portion of the two-dimensional face image may be performed by using a K-Nearest Neighbor (KNN) algorithm.

The generating of a three-dimensional montage may include: estimating an omitted portion of the two-dimensional face image based on the correlation of each face portion; and generating a three-dimensional montage based on the estimated information.

If the three-dimensional montage generation system and method based on a two-dimensional single image according to the present disclosure is used, a three-dimensional personal model may be generated from a single two-dimensional front face photograph, and depth information such as nose height, lip protrusion and eye contour may be effectively estimated by means of statistical distribution and correlation of data.

BRIEF DESCRIPTION OF THE DRAWINGS

The above and other aspects, features and advantages of the disclosed exemplary embodiments will be more apparent from the following detailed description taken in conjunction with the accompanying drawings in which.

| [Detailed Description of Main Elements] | |
|---|---|
| 1: three-dimensional montage generation system | 10: input unit |
| 20: feature point extraction unit | 30: model transformation unit |
| 40: depth estimation unit | 50: standard database |
| 60: montage generating unit | 70: display unit |

DETAILED DESCRIPTION

Hereinafter, the present disclosure will be described in detail with reference to the accompanying drawings. However, the accompanying drawings and following descriptions are just available embodiments of the three-dimensional montage generation system and method based on a two-dimensional single image according to the present disclosure, and the spirit of the present disclosure is not limited to the following contents.

Figure 1:
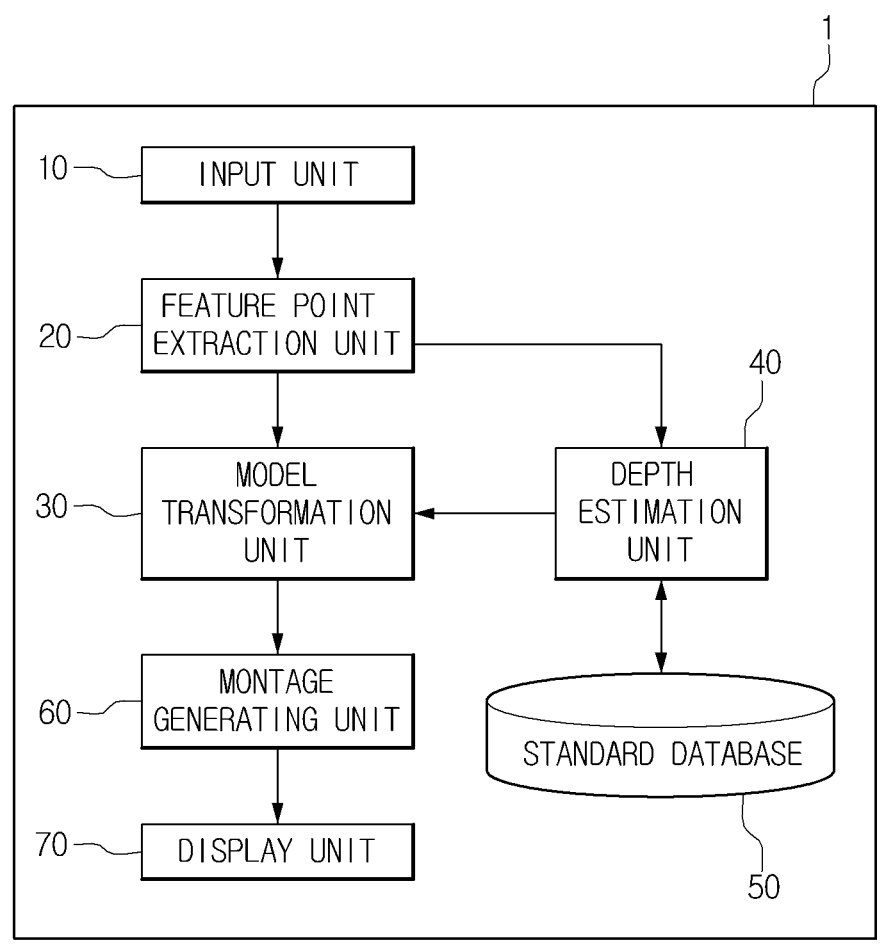
FIG. 1 is a schematic view showing a three-dimensional montage generation system according to an embodiment of the present disclosure.

FIG. 1 is a schematic view showing a three-dimensional montage generation system according to an embodiment of the present disclosure.

Referring to FIG. 1, a three-dimensional montage generation system 1 according to an embodiment of the present disclosure includes an input unit 10, a feature point extraction unit 20, a model transformation unit 30, a depth estimation unit 40, a standard database 50, a montage generating unit 60, and a display unit 70.

The input unit 10 allows a user to input a two-dimensional face image. The two-dimensional face shape may be a two-dimensional front image of a specific person.

The feature point extraction unit 20 plays a role of extracting a feature point of each body portions, such as the eye, the nose, the lips or the like, of the input two-dimensional front image input by the input unit 10.

The standard database 50 plays a role of storing three-dimensional face shape information previously prepared. In detail, the standard database 50 may store three-dimensional face scanning information of various persons in a preset group.

The depth estimation unit 40 plays a role of obtaining a correlation of each face portion from the three-dimensional face image information stored in the standard database 50 and estimating a depth of each portion of the two-dimensional face image based on the obtained correlation of each face portion. In other words, the standard database 50 stores various kinds of three-dimensional face shape information for a group such as Koreans, and the depth estimation unit 40 calculates an average facial shape and depth information of each face portion from the three-dimensional face shape information. Subsequently, the depth estimation unit 40 may estimate depth information of each body portion of the two-dimensional face image by comparing the feature point of the two-dimensional face image with the calculated information.

The model transformation unit 30 plays a role of projecting the two-dimensional face image to a three-dimensional template model previously prepared, and transforming the three-dimensional template model based on the feature point of the two-dimensional face image and the depth information of each portion of the two-dimensional face image estimated by the depth estimation unit.

The montage generating unit 60 plays a role of generating a three-dimensional montage by rendering the two-dimensional face image to the three-dimensional template model finally transformed by the model transformation unit 30.

The three-dimensional montage generation system 1 according to the present disclosure may generate a three-dimensional montage by estimating depth information of each face portion by using the standard database as described above. Hereinafter, a three-dimensional montage generation method of the three-dimensional montage generation system 1 according to the present disclosure will be described in detail.

Figure 2:
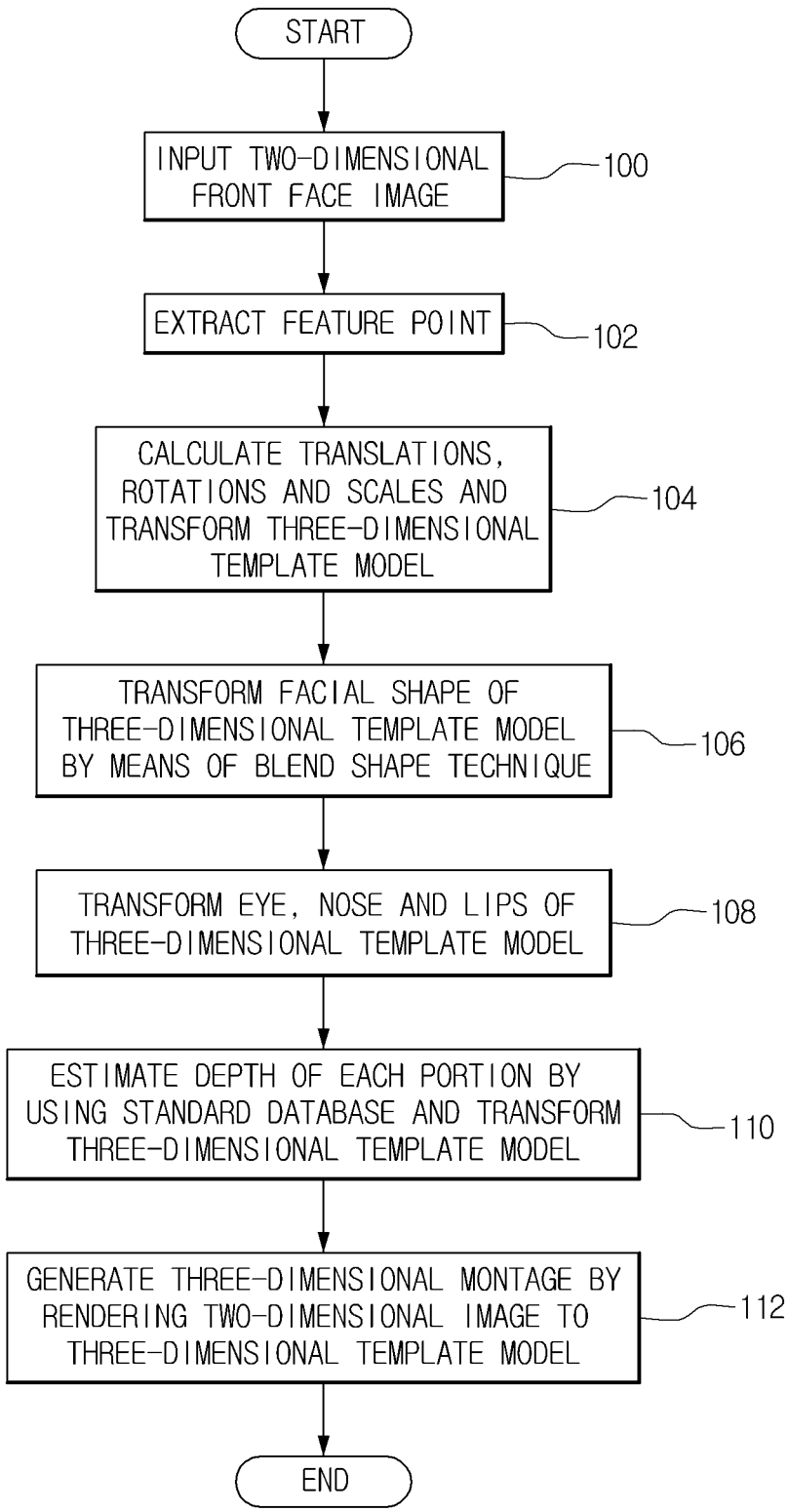
FIG. 2 is a flowchart for illustrating a three-dimensional montage generation method according to an embodiment of the present disclosure.

FIG. 2 is a flowchart for illustrating a three-dimensional montage generation method according to an embodiment of the present disclosure.

First, a two-dimensional front face image is input by the input unit 10 of the three-dimensional montage generation system 1 (Operation 100). The feature point extraction unit 20 extracts a feature point from the input two-dimensional front face image (Operation 102). At this time, a three-dimensional average template model is already prepared in the three-dimensional montage generation system 1.

The model transformation unit 30 calculates translations, rotations and scales and transforms the three-dimensional template model (Operation 104).

In detail, the model transformation unit 30 loads a coordinate of the face feature point of the two-dimensional front face image and projects the feature point to the three-dimensional template model through a projection matrix. After that, while comparing the feature point of the two-dimensional image with the feature point of the three-dimensional template model, the model transformation unit 30 repeatedly updates projections and calculations by calculating optimal translation and rotation until an error between two feature points decreases smaller than a preset threshold value.

Again, a coordinate of a face feature point of the two-dimensional image is loaded to add a scale by using the translation and the rotation obtained before. Next, a center of the horizontal axis of the three-dimensional template model is determined, and a weight is determined. Similarly, a center of the vertical axis of the three-dimensional template model is determined, and a weight is determined.

Next, a vertex of the three-dimensional model is transformed by using the previously calculated horizontal and vertical axis data, and until an error between the feature point of the input two-dimensional image and the feature point of the three-dimensional template model decreases smaller than a preset threshold value, translations, rotations and scales are calculated while repeating projections and updates.

If the three-dimensional template model is transformed as described above, the model transformation unit 30 transforms a facial shape of the three-dimensional template model again by means of the blend shape technique (Operation 106).

In detail, the model transformation unit 30 loads a coordinate of the feature point of the two-dimensional face image, and adds a blend-shape weight from the translation, the rotation and the scale obtained before.

In addition, a coordinate projected to the three-dimensional template model is calculated by using the translation, the rotation and the scale obtained before, and an optimal weight is calculated so that an error between the feature points decreases smaller than a preset threshold value while repeating projections and updates. After that, vertexes are transformed based on the basis and the weight, thereby obtaining a three-dimensional template model with a transformed facial shape.

In addition, the model transformation unit 30 transforms shapes of the eye, the nose and the lips of the three-dimensional template model by using the depth information of each portion estimated by the depth estimation unit 40 (Operation 108).

In detail, a feature point coordinate of the two-dimensional face image is loaded, and a center location, a vertex region and a weight of each face portion, such as the left eye portion, the right eye portion, the nose portion, the lips portion or the like, are obtained and stored. After that, the translation, the rotation and the scale are initialized, the vertexes of the eye, nose and lip portions are transformed, and the two-dimensional image is projected to the three-dimensional template model. After that, optimal translation, rotation and scale are calculated until an error between the feature points decreases smaller than a preset value, and projections and updates are repeated.

In addition, the model transformation unit 30 estimates a depth of each portion by using the three-dimensional face shape information stored in the standard database 50 and transforms the three-dimensional template model based on the estimated depth (Operation 110).

In detail, the model transformation unit 30 estimates information of a non-restorable depth or a portion without face information (namely, a portion not memorized or not witnessed) from the two-dimensional photograph by using the correlation of each face portion obtained from the three-dimensional face scan information of a preset group, and then transforms a completed three-dimensional vertex.

For this, the three-dimensional montage generation system 1 of the present disclosure builds the standard database 50 with various three-dimensional face scan data (for example, 500 or more data) classified by age and sex, applies a K-Nearest Neighbor (KNN) algorithm in consideration of two-dimensional coordinates of the selected feature points to extract N number of most similar scan data, and then estimates a depth value by obtaining average three-dimensional data from the N number of scan data.

If the three-dimensional template model is finally transformed completely as described above, the montage generating unit 60 texture-renders the two-dimensional image to the three-dimensional template model to generate a three-dimensional montage (Operation 112).

In detail, the montage generating unit 60 searches and stores three-dimensional vertex coordinates of the head portion and the ear portion, then projects the coordinates by using the finally calculated projection matrix, and renders the texture of the input two-dimensional image to the finally transformed model.

Figure 3:
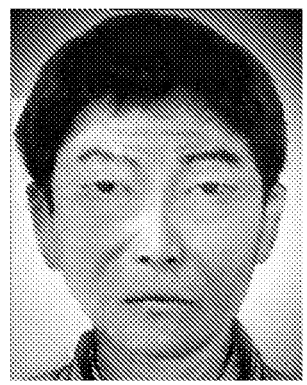
FIG. 3 shows an example of a two-dimensional front face image input to the three-dimensional montage generation system according to an embodiment of the present disclosure.
Figure 4:
FIG. 4 shows an example of a three-dimensional montage generated by the three-dimensional montage generation system according to an embodiment of the present disclosure.

FIG. 3 shows an example of a two-dimensional front face image input to the three-dimensional montage generation system according to an embodiment of the present disclosure, and FIG. 4 shows an example of a three-dimensional montage generated based on the input image of FIG. 3. It may be understood that a three-dimensional montage where depth information of each face portion is naturally reflected is generated based the previously prepared database.

As described above, since the three-dimensional montage generation system 1 according to an embodiment of the present disclosure approximates a shape of an input two-dimensional photograph and uses a texture without change, a montage having a high degree of modeling completion and no difference may be obtained rapidly by using a simple and fast calculation. In addition, it is possible to build a three-dimensional face scan database and estimate curve points of a three-dimensional face, which may not be easily obtained from a single photograph, by means of statistical forecasting. By doing so, the present disclosure allows making a more accurate montage by estimating face portions which have not been witnessed or not memorized.

While the exemplary embodiments have been shown and described, it will be understood by those skilled in the art that various changes in form and details may be made thereto without departing from the spirit and scope of the present disclosure as defined by the appended claims.

What is claimed is:

1. A three-dimensional montage generation system based on a single two-dimensional image, comprising:
   a feature point extraction unit configured to extract a feature point of an input two-dimensional face image;
   a database configured to store three-dimensional face image information;
   a depth estimation unit configured to obtain a correlation between the three-dimensional face image information and the feature point, and estimate a depth of each portion of the two-dimensional face image based on the correlation;
   a model transformation unit configured to project the two-dimensional face image to a three-dimensional template model and transform the three-dimensional template model based on the feature point and the estimated depth information of each portion of the two-dimensional face image; and
   a montage generating unit configured to generate a three-dimensional montage by rendering the two-dimensional face image to the transformed three-dimensional template model,
   wherein the correlation is based on a comparison of a facial features characteristic of a predetermined facial type; and
   wherein the depth of each portion of the two-dimensional face image is estimated based on a comparison of an average facial shape and predetermined depth of features of the facial features characteristic of the predetermined facial type with the feature point of the two-dimensional face image.

2. The three-dimensional montage generation system based on a single two-dimensional image according to claim 1,
   wherein the model transformation unit calculates translations, rotations and scales of the two-dimensional face image and the three-dimensional template model, and repeats the projecting operation and the calculating operation until an error between the two-dimensional face image and the three-dimensional template model is less than a preset threshold value.

3. The three-dimensional montage generation system based on a single two-dimensional image according to claim 2,
   wherein the model transformation unit transforms a facial shape of the three-dimensional template model using a blend shape technique.

4. The three-dimensional montage generation system based on single a two-dimensional image according to claim 1,
   wherein the depth estimation unit estimates a depth of each portion of the two-dimensional face image by using a K-Nearest Neighbor (KNN) algorithm.

5. The three-dimensional montage generation system based on a single two-dimensional image according to claim 4,
   wherein the depth estimation unit selects three-dimensional face image information from the database using the correlation to estimate the depth of each portion of the two-dimensional face image, and
   wherein a difference between a feature point of the selected three-dimensional face image information and the feature point of the two-dimensional face image is within a predetermined range.

6. The three-dimensional montage generation system based on a single two-dimensional image according to claim 1,
   wherein the montage generating unit generates a three-dimensional montage by estimating information of an omitted portion of the two-dimensional face image based on the correlation.

7. The three-dimensional montage generation system based on a single two-dimensional image according to claim 1,
   wherein the depth estimation unit estimates the depth of each portion of the two-dimensional face image based further on a depth value of a three-dimensional face image included in the three-dimensional face image information.

8. The three-dimensional montage generation system based on a single two-dimensional image according to claim 1, wherein the transformation of the three-dimensional template model further comprises obtaining one of a center location, a vertex region, or a weight of each face portion.

9. A three-dimensional montage generation method based on a single two-dimensional image, comprising:
   extracting a feature point of a two-dimensional face image;

obtaining a correlation between the feature point and three-dimensional face image information stored in a database;

estimating a depth of each portion of the two-dimensional face image based on the correlation;

transforming a three-dimensional template model based on the feature point and the estimated depth information of each portion of the two-dimensional face image; and generating a three-dimensional montage by rendering the two-dimensional face image to the transformed three-dimensional template model, wherein the correlation is based on a comparison of a facial features characteristic of a predetermined facial type, as included in the three-dimensional face image information stored in the database; and wherein the depth of each portion of the two-dimensional face image is estimated based on a comparison of an average facial shape and predetermined depth of features of the facial features characteristic of the predetermined facial type with the feature point of the two-dimensional face image.

10. The three-dimensional montage generation method based on a single two-dimensional image according to claim 9, wherein the transforming comprises:

projecting the two-dimensional face image to the three-dimensional template model;

calculating translations, rotations and scales of the two-dimensional face image and the three-dimensional template model; and repeating the projecting and the calculating until an error between the two-dimensional face image and the three-dimensional template model is less than a preset threshold value.

11. The three-dimensional montage generation method based on a single two-dimensional image according to claim 9, wherein the transforming comprises:

transforming a facial shape of the three-dimensional template model using a blend shape technique.

12. The three-dimensional montage generation method based on a single two-dimensional image according to claim 9, wherein the estimating is performed by using a K-Nearest Neighbor (KNN) algorithm.

13. The three-dimensional montage generation method based on a single two-dimensional image according to claim 12, wherein the estimating comprises selecting three-dimensional face image information from the database using the correlation to estimate the depth of each portion of the two-dimensional face image, and wherein a difference between a feature point of the selected three-dimensional face image information and the feature point of the two-dimensional face image is within a predetermined range.

14. The three-dimensional montage generation method based on a single two-dimensional image according to claim 9, wherein the generating comprises:

estimating information of an omitted portion of the two-dimensional face image based on the correlation; and generating a three-dimensional montage based on the estimated information.

15. The three-dimensional montage generation method based on a single two-dimensional image according to claim 9, wherein the estimating is further based on a depth value of a three-dimensional face image included in the three-dimensional face image information.

16. A three-dimensional montage generation system based on a single two-dimensional image, comprising:

a processor configured to extract a feature point of an input two-dimensional face image;

store three-dimensional face image information;

obtain a correlation between the three-dimensional face image information and the feature point, and estimate a depth of each portion of the two-dimensional face image based on the correlation;

project the two-dimensional face image to a three-dimensional template model and transform the three-dimensional template model based on the feature point and the estimated depth information of each portion of the two-dimensional face image; and generate a three-dimensional montage by rendering the two-dimensional face image to the transformed three-dimensional template model, wherein the correlation is based on a comparison of a facial features characteristic of a predetermined facial type, and wherein the depth of each portion of the two-dimensional face image is estimated based on a comparison of an average facial shape and predetermined depth of features of the facial features characteristic of the predetermined facial type with the feature point of the two-dimensional face image.

* * * * *